(12) United States Patent
Fish

(10) Patent No.: US 8,533,777 B2
(45) Date of Patent: Sep. 10, 2013

(54) MECHANISM TO DETERMINE TRUST OF OUT-OF-BAND MANAGEMENT AGENTS

(75) Inventor: Andrew J. Fish, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 11/025,751

(22) Filed: Dec. 29, 2004

(65) Prior Publication Data

US 2006/0236371 A1    Oct. 19, 2006

(51) Int. Cl.
*H04L 9/32*    (2006.01)

(52) U.S. Cl.
USPC ............... 726/2; 726/3; 726/4; 726/5; 726/6; 713/163; 713/164; 713/176; 713/182

(58) Field of Classification Search
USPC ............................................................ 726/2
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen |
| 4,521,852 A | 6/1985 | Guttag |
| 4,571,672 A | 2/1986 | Hatada et al. |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard et al. |

(Continued)

FOREIGN PATENT DOCUMENTS

| | | |
|---|---|---|
| AU | 6564601 A | 3/2002 |
| DE | 4217444 | 12/1992 |

(Continued)

OTHER PUBLICATIONS

International Preliminary Report on Patentability for PCT Patent Application No. PCT/US045998, mailed on Jul. 12, 2007, 7 Pages.

(Continued)

*Primary Examiner* — Kambiz Zand
*Assistant Examiner* — Yonas Bayou
(74) *Attorney, Agent, or Firm* — Grossman, Tucker, Perreault & Pfleger, PLLC

(57) ABSTRACT

According to one embodiment, computer system is disclosed. The computer system includes a central processing unit (CPU) to simultaneously operate a trusted environment and an untrusted environment and a chipset coupled to the CPU. The chipset includes an interface to couple to a management agent, and protected registers having a bit to indicate if the management agent is provided access to resources within the trusted environment.

19 Claims, 4 Drawing Sheets

(56) References Cited

U.S. PATENT DOCUMENTS

| | | |
|---|---|---|
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,305,460 A * | 4/1994 | Kaneko et al. ............... 711/163 |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,517,651 A | 5/1996 | Huck et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,628,023 A | 5/1997 | Bryant et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,889 A | 6/1998 | Ault et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal et al. |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,935,249 A | 8/1999 | Stern et al. |
| 5,937,063 A | 8/1999 | Davis |
| 5,953,502 A | 9/1999 | Helbig, Sr. |
| 5,956,408 A | 9/1999 | Arnold |
| 5,956,753 A | 9/1999 | Glew et al. |
| 5,970,147 A | 10/1999 | Davis |
| 5,978,475 A | 11/1999 | Schneier et al. |
| 5,978,481 A | 11/1999 | Ganesan et al. |
| 5,987,557 A | 11/1999 | Ebrahim |
| 5,987,604 A | 11/1999 | Edrich |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo et al. |
| 6,075,938 A | 6/2000 | Bugnion et al. |
| 6,076,160 A | 6/2000 | Wisor |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,275,939 B1 * | 8/2001 | Garrison ........................... 726/6 |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery |
| 6,314,409 B2 | 11/2001 | Schneck et al. |
| 6,317,742 B1 * | 11/2001 | Nagaratnam et al. .................. 1/1 |
| 6,321,314 B1 | 11/2001 | Van Dyke |
| 6,327,652 B1 | 12/2001 | England et al. |
| 6,330,670 B1 | 12/2001 | England et al. |
| 6,330,677 B1 * | 12/2001 | Madoukh ........................... 726/2 |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams et al. |
| 6,374,286 B1 | 4/2002 | Gee et al. |
| 6,374,317 B1 | 4/2002 | Ajanovic et al. |
| 6,378,068 B1 | 4/2002 | Foster et al. |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |

| | | | |
|---|---|---|---|
| 6,421,702 B1 | 7/2002 | Gulick | |
| 6,435,416 B1 | 8/2002 | Slassi | |
| 6,445,797 B1 | 9/2002 | McGough | |
| 6,457,068 B1 | 9/2002 | Nayyar et al. | |
| 6,463,535 B1 | 10/2002 | Drews | |
| 6,463,537 B1 | 10/2002 | Tello | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,671,808 B1 | 12/2003 | Abbott et al. | |
| 6,678,825 B1 | 1/2004 | Ellison et al. | |
| 6,684,326 B1 | 1/2004 | Cromer et al. | |
| 6,754,815 B1 | 6/2004 | Ellison et al. | |
| 6,760,441 B1 | 7/2004 | Ellison et al. | |
| 6,769,058 B1 | 7/2004 | Ellison et al. | |
| 6,795,905 B1 | 9/2004 | Ellison et al. | |
| 6,820,177 B2 | 11/2004 | Poisner | |
| 6,829,712 B1* | 12/2004 | Madoukh | 726/2 |
| 6,883,098 B1* | 4/2005 | Roman et al. | 726/5 |
| 6,934,817 B2 | 8/2005 | Ellison et al. | |
| 7,069,442 B2* | 6/2006 | Sutton et al. | 713/179 |
| 7,133,990 B2 | 11/2006 | Link et al. | |
| 7,200,758 B2 | 4/2007 | Zimmer | |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2002/0007456 A1 | 1/2002 | Peinado et al. | |
| 2002/0007461 A1* | 1/2002 | Garrison | 713/202 |
| 2002/0023032 A1 | 2/2002 | Pearson et al. | |
| 2002/0147916 A1 | 10/2002 | Strongin et al. | |
| 2002/0166061 A1 | 11/2002 | Falik et al. | |
| 2002/0169717 A1 | 11/2002 | Challener | |
| 2002/0184520 A1 | 12/2002 | Bush et al. | |
| 2003/0018892 A1 | 1/2003 | Tello | |
| 2003/0074548 A1 | 4/2003 | Cromer et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0188165 A1* | 10/2003 | Sutton et al. | 713/176 |
| 2003/0188179 A1 | 10/2003 | Challener et al. | |
| 2003/0196085 A1 | 10/2003 | Lampson et al. | |
| 2003/0200405 A1 | 10/2003 | Willman et al. | |
| 2003/0204693 A1* | 10/2003 | Moran et al. | 711/163 |
| 2003/0226014 A1* | 12/2003 | Schmidt et al. | 713/164 |
| 2004/0003321 A1* | 1/2004 | Glew et al. | 714/27 |
| 2004/0015694 A1 | 1/2004 | DeTreville | |
| 2004/0083356 A1 | 4/2004 | Chatterjee et al. | |
| 2004/0117539 A1 | 6/2004 | Bennett et al. | |
| 2006/0031679 A1* | 2/2006 | Soltis et al. | 713/182 |

FOREIGN PATENT DOCUMENTS

| | | |
|---|---|---|
| EP | 0312194 | 4/1984 |
| EP | 0473913 A2 | 3/1992 |
| EP | 0600112 A1 | 6/1994 |
| EP | 0892521 A2 | 1/1999 |
| EP | 0930567 A2 | 7/1999 |
| EP | 0961193 A2 | 12/1999 |
| EP | 0965902 A2 | 12/1999 |
| EP | 1030237 A1 | 8/2000 |
| EP | 1055989 A1 | 11/2000 |
| EP | 1056014 A1 | 11/2000 |
| EP | 1085396 A1 | 3/2001 |
| EP | 1146715 A1 | 10/2001 |
| EP | 1271277 A2 | 1/2003 |
| JP | 2000/076139 A | 3/2000 |
| TW | 200414051 A | 8/2004 |
| TW | 200423616 A | 11/2004 |
| WO | 95/24696 A2 | 9/1995 |
| WO | 97/29567 A1 | 8/1997 |
| WO | 98/12620 A1 | 3/1998 |
| WO | 98/34365 A1 | 8/1998 |
| WO | 98/44402 A1 | 10/1998 |
| WO | 99/05600 A2 | 2/1999 |
| WO | 99/09482 A1 | 2/1999 |
| WO | 99/18511 A1 | 4/1999 |
| WO | 99/57863 A1 | 11/1999 |
| WO | 99/65579 A1 | 12/1999 |
| WO | 00/21238 A1 | 4/2000 |
| WO | 00/62232 A1 | 10/2000 |
| WO | 2001/016772 A1 | 3/2001 |
| WO | 01/27723 A1 | 4/2001 |
| WO | 01/27821 A2 | 4/2001 |
| WO | 01/63994 A2 | 8/2001 |
| WO | 01/75564 A2 | 10/2001 |
| WO | 01/75565 A2 | 10/2001 |
| WO | 01/75595 A2 | 10/2001 |
| WO | 02/01794 A2 | 1/2002 |
| WO | 02/17555 A2 | 2/2002 |
| WO | 02/060121 A1 | 8/2002 |
| WO | 02/086684 A2 | 10/2002 |
| WO | 03/058412 A2 | 7/2003 |
| WO | 2006/071610 A1 | 7/2006 |

OTHER PUBLICATIONS

Office Action Received for Taiwanese Patent Application No. 94146144, mailed on Jul. 2, 2008. 5 pages.

Office Action received for German Patent Application No. 11 2005 003 340.6, mailed Jun. 15, 2009; 4 pages.

Office Action for GB Patent Application No. GB0714632.7 Mailed Feb. 11, 2009 ; 11 pages.

Notice of Allowance received for U.S. Appl. No. 10/112,169, mailed on Jan. 6, 2005.

Notice of Allowance received for U.S. Appl. No. 10/112,169, mailed on Nov. 28, 2005.

IPEA/US, International Preliminary Examination Report for International Application No. PCT/US03/08762, 4 pages, Jan. 19, 2005.

Coulouris, G. et al., "Distributed Systems: Concepts and Design", 2nd Edition, Addison-Wesley Publishers Ltd., Essex, England, pp. 422-424 (1994).

Crawford, J., "Architecture of the Intel 80386", Proceedings of the IEEE International Conference on Computer Design: VLSI in Computers (ICCD '86), ISBN 0-8186-0735-1, pp. 155-160 (Oct. 6-9, 1986).

Fabry, R.S., "Capability-Based Addressing", Communications of the ACM, vol. 17, No. 7, pp. 403-412 (Jul. 1974).

Frieder, G., "The Architecture and Operational Characteristics of the VMX Host Machine", IEEE Proceedings of the 15th Annual Workshop on Microprogramming, pp. 9-16, (Oct. 5, 1982).

Hewlett Packard Company, "Mobile Security Overview", pp. 1-9, (Sep. 2002).

IBM Corporation, "IBM ThinkPad T30 Notebooks", IBM Product Specification, located at www-1.ibm.com/services/files/cisco_t30_spec_sheet_070202.pdf, pp. 1-6 (Jul. 2, 2002).

Intel Corporation, "Intel 82802AB/82802AC Firmware Hub (FWH)", Intel Product Datasheet, Document No. 290658-004, pp. 1-6, 17-28 (Nov. 2000).

Menezes, Alfred J., et al., "Handbook of Applied Cryptography", CRC Press Series on Discrete Mathematics and its Applications, Boca Raton, FL, ISBN 0849385237, pp. 403-405, 506-515, 570 (Oct. 1996).

Nanba, S. et al., "VM/4: ACOS-4 Virtual Machine Architecture", IEEE Proceedings of the 12th Annual Symposium on Computer Architecture, pp. 171-178 (Jun. 1985).

RSA Security Inc., "Hardware Authenticators", located at www.rsasecurity.com/node.asp?id=1158, pp. 1-2 (2004).

RSA Security Inc., "Software Authenticators", located at www.rsasecurity.com/node.asp?id=1313, pp. 1-2 (2004).

RSA Security Inc., "RSA SecurID Authenticators", located at www.rsasecurity.com/products/securid/datasheets/SID_DS_0103.pdf, pp. 1-2 (2003).

Schneier, B., "Applied Cryptography: Protocols, Algorithm, and Source Code in C", 2nd Edition, Wiley, John & Sons, Inc., ISBN 0471117099 (hardcover printing), pp. 47-52, 56-65, 169-187 (Oct. 1995).
Schneier, B., "Applied Cryptography: Protocols, Algorithm, and Source Code in C", 2nd Edition, Wiley, John & Sons, Inc., ISBN 0471128457 (softcover printing), pp. 28-33, 176-177, 216-217, 461-473, 518-522 (Nov. 1995).
Intel Corporation, "IA-64 System Abstraction Layer Specification", Intel Product Specification, Order No. 245359-001, 112 pages, Jan. 2000.
Intel Corporation, "Intel IA-64 Architecture Software Developer's Manual—vol. 2: IA-64 System Architecture", Intel Product Manual, Order No. 245318-001, pp. i, ii, 5.1-5.3, 11.1-11.8, 11.23-11.26, Jan. 2000.
Brands, Stefan , "Restrictive Blinding of Secret-Key Certificates", Springer-Verlag XP002201306, (1995), Chapter 3.
Davida, George I., et al., "Defending Systems Against Viruses through Cryptographic Authentication", Proceedings of the Symposium on Security and Privacy, IEEE Comp. Soc. Press, ISBN 0-8186-1939-2, (May 1989).
Intel Corporation, "IA-32 Intel Architecture Software Developer's Manual Citation: vol. 3: System Programming Guide Miscellaneous Information", (2003), pp. 13-1 to 13-24.
Kashiwagi, Kazuhiko , et al., "Design and Implementation of Dynamically Reconstructing System Software", Software Engineering Conference, Proceedings 1996 Asia-Pacific Seoul, South Korea Dec. 4-7, 1996, Los Alamitos, CA USA, IEEE Comput. Soc, US, ISBN 0-8186-7638-8, (1996).
Luke, Jahn, et al., "Replacement Strategy for Aging Avionics Computers", IEEE AES Systems Magazine, XP002190614, (Mar. 1999).
Menezes, Oorschot, "Handbook of Applied Cryptography", CRC Press LLC USA XP002201307, 1997, p. 475.
Richt, Stefan , et al., "In-Circuit-Emulator Wird Echtzeittauglich", Elektronic, Franzis Verlag GMBH, Munchen, DE, vol. 40, No. 16, XP000259620, (Aug. 6, 1991), pp. 100-103.
Saez, Sergio , et al., "A Hardware Scheduler for Complex Real-Time Systems", Proceedings of the IEEE International Symposium on Industrial Electronics, XP002190615, (Jul. 1999), pp. 43-48.
Sherwood, Timothy , et al., "Patchable Instruction ROM Architecture", Department of Computer Science and Engineering, University of California, San Diego, La Jolla, CA, (Nov. 2001).
"Information Display Technique for a Terminate Stay Resident Program" IBM Technical Disclosure Bulletin, TDB-ACC-No. NA9112156, vol. 34, Issue 7A, (Dec. 1, 1991), pp. 156-158.
Karger, Paul A., et al., "A VMM Security Kernal for the VAX Architecture", Proceedings of the Symposium on Research in Security and Privacy, Boxborough, MA, XP010020182, ISBN 0-8186-2060-9, (May 7, 1990), pp. 2-19.
Chien, Andrew A., et al., "Safe and Protected Execution for the Morph/AMRM Reconfigurable Processor", 7th Annual IEEE Symposium, FCCM '99 Proceedings, Los Alamitos, CA, XP010359180, ISBN 0-7695-0375-6, (Apr. 21, 1999), pp. 209-221.
Robin, John S., et al., "Analysis of the Pentium's Ability to Support a Secure Virtual Machine Monitor", Proceedings of the 9th USENIX Security Symposium, Denver, Colorado, CO, XP002247347, (Aug. 14, 2000), pp. 1-17.
Heinrich, Joe , "MIPS R4000 Microprocessor User's Manual", Apr. 1, 1993, MIPS, MT. View, XP002184449, pp. 61-97.
Heinrich, Joe , "MIPS R4000 Microprocessor User's Manual", 1994, MIPS Technology, Inc., MT. View, CA, pp. 67-79.
Motorola Inc., "M68040 User's Manual", (1993), pp. 1-20.
Intel Corporation, "Intel 386 DX Microprocessor 32-Bit CHMOS Microprocessor With Integrated Memory Management", figures 4-14, (Dec. 31, 1995), pp. 5-56.
Berg, Cliff , "How Do I Create a Signed Applet?", Dr. Dobb's Journal, M&T Publ., Redwood City, CA, US, vol. 22, No. 8, (Aug. 1997), pp. 1-9.
Gong, Li , et al., "Going Beyond the Sandbox: An Overview of the New Security Architecture in the Java Development Kit 1.2", Proceedings of the USENIX Symposium on Internet Technologies and Systems, Monterey, CA, (Dec. 1997), pp. 103-112.
Gum, P. H., "System/370 Extended Architecture: Facilities for Virtual Machines", IBM J. Research Development, vol. 27, No. 6, (Nov. 1983), pp. 530-544.
Rosenblum, M. , "Vmware's Virtual Platform: A Virtual Machine Monitor for Commodity PCs", Proceedings of the 11th Hotchips Conference, (Aug. 1999), pp. 185-196.
Lawton, Kevin, "Running Multiple Operating Systems Concurrently on an IA32 PC Using Virtualization Techniques", http://www.plex86.org/research/papertxt, (Nov. 29, 1999), pp. 1-31.
Compaq Computer Corporation, et al., "Trusted Computing Platform Alliance (TCPA) Main Specification Version 1.1a", (Dec. 2001), pp. 1-321.
Goldberg, Robert, "Survey of Virtual Machine Research", IEEE Computer Magazine, 7(6), 1974, pp. 34-35.
Final Office Action received for U.S. Appl. No. 10/185,123, mailed on Oct. 17, 2006, pp. 14.
Final Office Action received for U.S. Appl. No. 10/185,123, mailed on Oct. 30, 2007, pp. 11.
Final Office Action received for U.S. Appl. No. 10/185,123, mailed on Sep. 17, 2008, pp. 11.
Non-Final Office Action received for U.S. Appl. No. 10/185,123, mailed on Oct. 19, 2005, pp. 9.
Non-Final Office Action received for U.S. Appl. No. 10/185,123, mailed on Apr. 7, 2006, pp. 12.
Non-Final Office Action received for U.S. Appl. No. 10/185,123, mailed on Apr. 16, 2007, pp. 10.
Non-Final Office Action received for U.S. Appl. No. 10/185,123, mailed on Apr. 2, 2008, pp. 12.
Office Action received for German Patent Application No. 11 2005 003 340.6-53, mailed on Feb. 26, 2010, 2 pages of Office Action and English translation of 2 pages.
Office Action received for German Patent Application No. 11 2005 003 3406-53, mailed on Apr. 7, 2008, 3 pages of Office Action and English translation of 2 pages.
Notice of Allowance received for Taiwanese Patent Application No. 94146144, mailed on Feb. 5, 2009, 2 pages of Notice of Allowance and English translation of 1 page.
PCT Search Report, PCT/US2005/045998, mailed May 18, 2006.

* cited by examiner

MECHANISM TO DETERMINE TRUST OF OUT-OF-BAND MANAGEMENT AGENTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to computer systems that may operate in a trusted or secured environment.

BACKGROUND

The increasing number of financial and personal transactions being performed on local or remote microcomputers has given impetus for the establishment of "trusted" or "secured" microprocessor environments. The problem these environments try to solve is that of loss of privacy, or data being corrupted or abused. Users do not want their private data made public. They also do not want their data altered or used in inappropriate transactions. Examples of these include unintentional release of medical records or electronic theft of funds from an on-line bank or other depository. Similarly, content providers seek to protect digital content (for example, music, other audio, video, or other types of data in general) from being copied without authorization.

Out-of-band management agents, such as intelligent platform management interface (IPMI) controllers, may need to access resources within a computer system. However, access to the system by out-of-band management agent access could be used to facilitate a security attack.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A mechanism to provide an out-of-band management agent access to a secured computer system is described. According to one embodiment, a trusted port in the computer system is implemented to transmit encryption keys to a USB peripheral without using a USB stack.

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
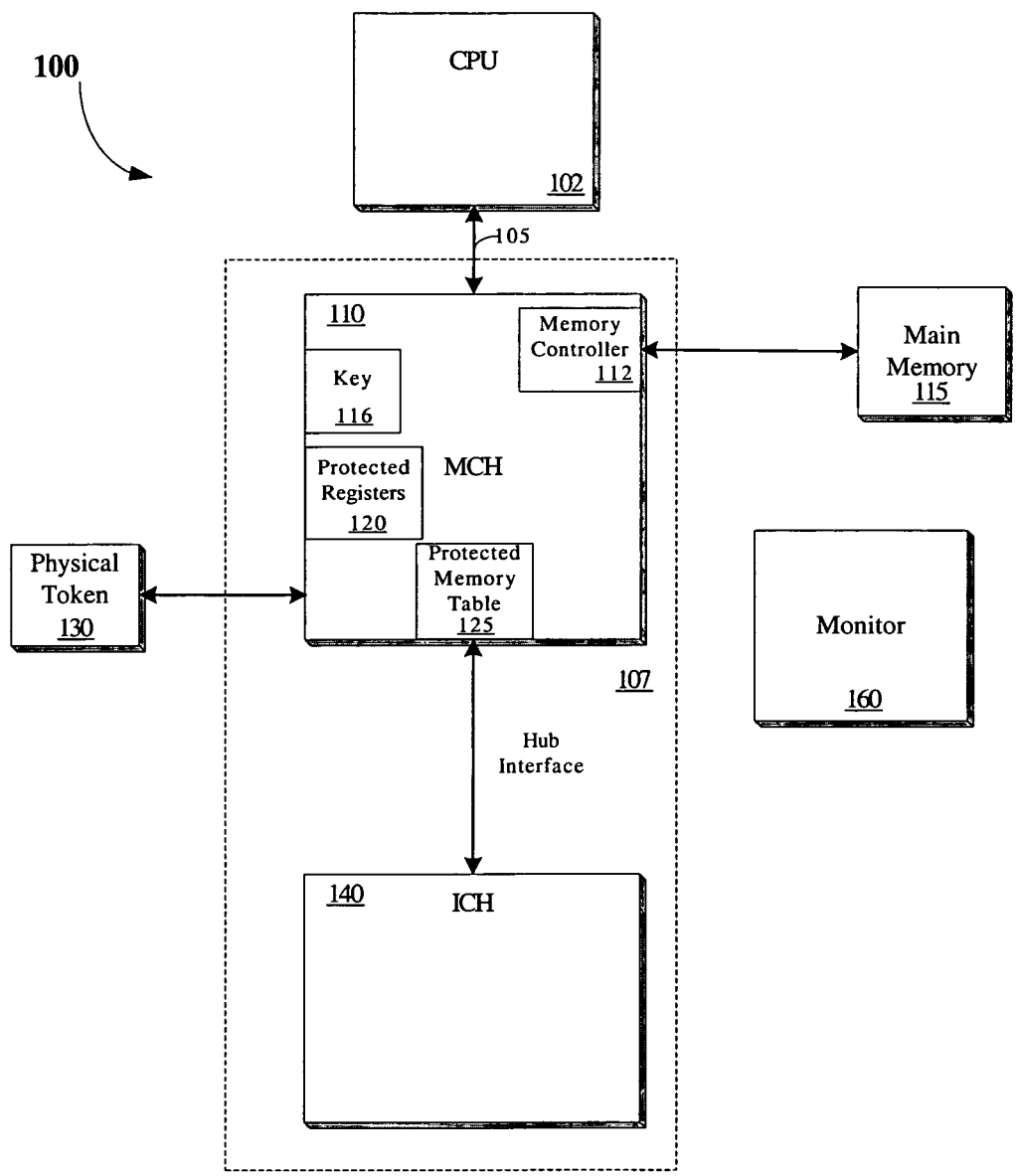
FIG. 1 is a block diagram of one embodiment of a computer system.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

According to one embodiment, CPU 102 includes circuits or logic elements to support secure or trusted operations. For example, CPU 102 may include secure enter (SENTER) logic, not shown, to support the execution of special SENTER instructions that may initiate trusted operations, which may curtail the ability of potentially hostile untrusted code to access secure resources within computer system 100.

Figure 2:
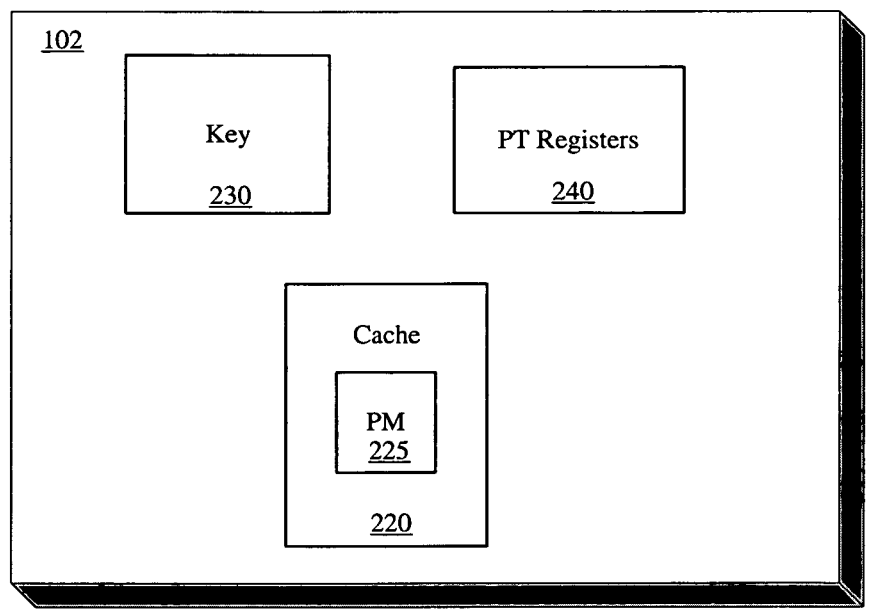
FIG. 2 illustrates one embodiment of a central processing unit.

Additionally, CPU 102 may include secure memory to support secure operations. FIG. 2 is a block diagram illustrating one embodiment of CPU 102. CPU 102 includes cache memory (cache) 220, embedded key 230, and page table (PT) registers 240. All or part of cache 220 may include, or be convertible to, private memory (PM) 225. According to one embodiment, private memory 225 is a memory with sufficient protections to prevent access to it by any unauthorized device (e.g., any device other than the associated CPU 102) while activated as a private memory.

In the illustrated embodiment, cache 220 may have various features to permit its selective isolation as a private memory. In another embodiment not shown, private memory 225 may be external to and separate from cache memory 220, but still associated with CPU 102. Key 230 may be an embedded key to be used for encryption, decryption, and/or validation of various blocks of data and/or code. PT registers 240 may be a table in the form of registers to identify memory pages that are to be accessible only by protected code, and which memory pages are not to be protected.

Referring back to FIG. 1, a chipset 107 is also coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to bus 105, such as multiple CPUs and/or multiple system memories.

Memory 115 may include a protected memory table to define which memory blocks (where a memory block is a range of contiguously addressable memory locations) in memory 115 are to be inaccessible to direct memory access (DMA) transfers. Since all accesses to memory 115 go through MCH 110, MCH 110 may check the protected memory table before permitting any DMA transfer to take place. In a particular embodiment, MCH 110 may use caching techniques to reduce the number of necessary accesses to protected memory table 320.

According to one embodiment, MCH 110 includes key 116 to be used in various encryption, decryption and/or validation processes, protected registers 120 and protected memory table 125. In one embodiment, the protected memory table 125 is implemented in MCH 110 as protected memory table 125 and the protected memory table in memory 115 may be eliminated.

In another embodiment, protected memory table 125 is implemented as the protected memory table in memory 115 as previously described and protected memory table 125 may be eliminated. The protected memory table may also be implemented in other ways not shown. Regardless of physical location, the purpose and basic operation of the protected memory table may be substantially as described.

In one embodiment, protected registers 120 are registers that are writable by commands that may only be initiated by trusted microcode in CPU 102. Protected microcode is microcode whose execution may be initiated by authorized instruction(s) and/or by hardware that is not controllable by unauthorized devices.

In one embodiment, protected registers 120 include a register to enable or disable the use of the protected memory table. Protected registers 120 may also include a writable register identifying the location of the protected memory table so that the location does not have to be hardwired into MCH 110. In a further embodiment, protected registers 120 may include a mode bit to determine the level of access for an out-of-band management agent, as will be discussed below in greater detail.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown). An interface may be used to connect chipset 107 with token 130. Physical token 130 may be a circuit to protect data related to creating and maintaining a protected operating environment.

In a particular embodiment, physical token 130 includes a key (not shown), which may be an embedded key to be used for specific encryption, decryption and/or validation processes. Physical token 130 may also include storage space to be used to hold a digest value and other information to be used in the protected operating environment. In one embodiment the storage space in physical token 130 may include non-volatile memory (e.g., flash memory) to retain its contents in the event of power loss to the physical token.

A secure Virtual Machine Monitor 130 module may be stored on a system disk or other mass storage, and moved or copied to other locations as necessary. In one embodiment, prior to beginning a secure launch process monitor 160 may be moved or copied to one or more memory pages in memory 115. Following a secure enter process, a virtual machine environment may be created in which monitor 160 may operate as the most privileged code within the system, and may be used to permit or deny direct access to certain system resources by the operating system or applications within the created virtual machines.

Figure 3:
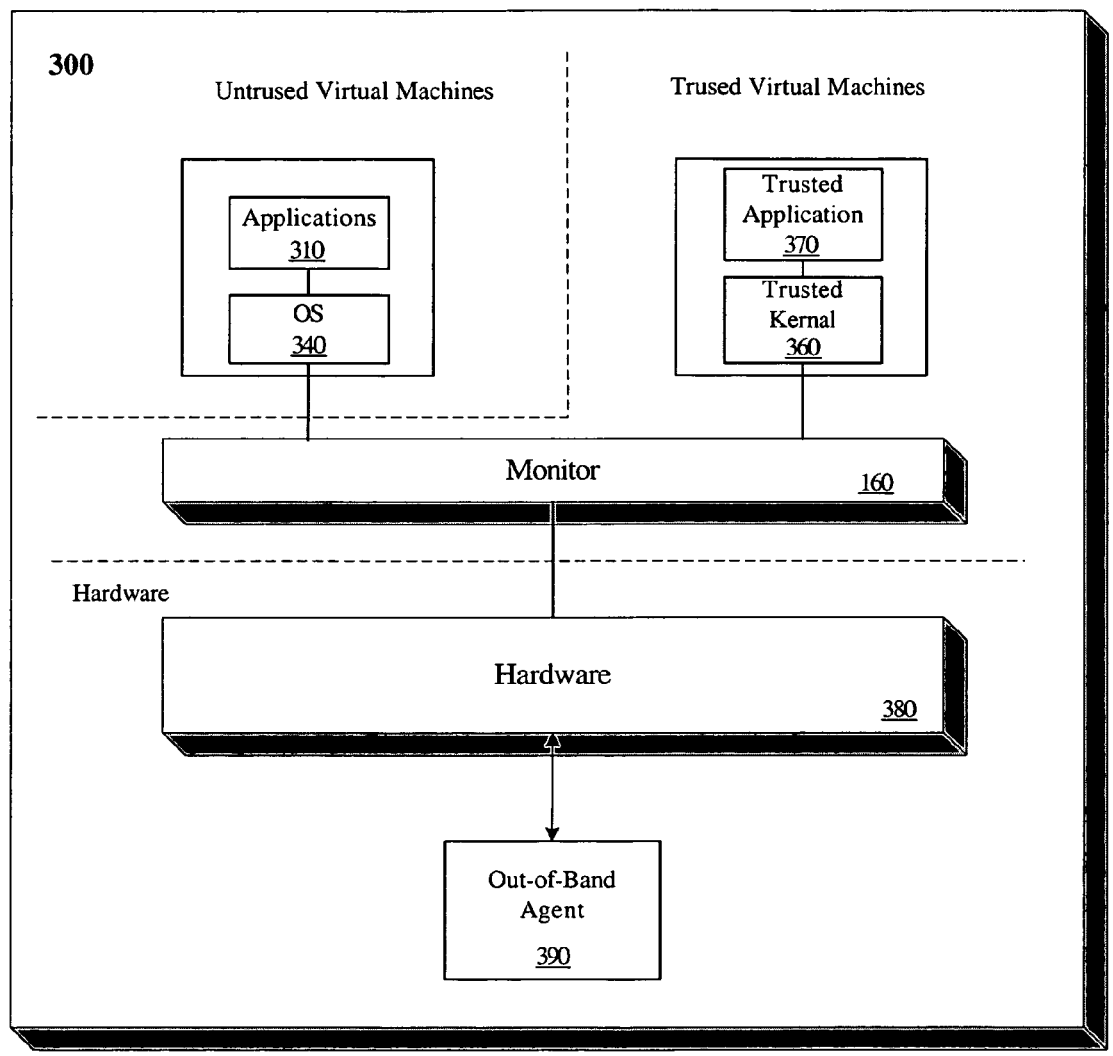
FIG. 3 is a diagram of one embodiment of a trusted or secured software environment.

Once execution control is transferred to monitor 160, computer system 100 enters a trusted or secured software environment (or platform). FIG. 3 illustrates one embodiment of a trusted or secured platform 300. In the FIG. 3 embodiment, trusted and untrusted software may be loaded simultaneously and may execute simultaneously on a single computer system. Monitor 160 selectively permits or prevents direct access to hardware resources 390 from one or more untrusted operating systems 340 and untrusted applications 310.

In this context, "untrusted" does not necessarily mean that the operating system or applications are deliberately misbehaving, but that the size and variety of interacting code makes it impractical to reliably assert that the software is behaving as desired, and that there are no viruses or other foreign code interfering with its execution. In a typical embodiment, the untrusted code might include the normal operating system and applications found on today's personal computers.

Monitor 160 also selectively permits or prevents direct access to hardware resources 380 from one or more trusted or secure kernels 360 and one or more trusted applications 370. Such a trusted or secure kernel 360 and trusted applications 370 may be limited in size and functionality to aid in the ability to perform trust analysis upon it. The trusted application 370 may be any software code, program, routine, or set of routines which is executable in a secure environment. Thus, the trusted application 370 may be a variety of applications, or code sequences, or may be a relatively small application such as a Java applet.

Instructions or operations normally performed by operating system 340 or kernel 360 that could alter system resource protections or privileges may be trapped by monitor 160, and selectively permitted, partially permitted, or rejected. As an example, in a typical embodiment, instructions that change the CPU 102 page table that would normally be performed by operating system 340 or kernel 360 would instead be trapped by monitor 160, which would ensure that the request was not attempting to change page privileges outside the domain of its virtual machine.

Also shown in FIG. 3, is an out-of-band management agent 390. In one embodiment, out-of-band management agent 390 is an entity that operates software separate from computer system 100. Out-of-band management agent 390 may be implemented as an intelligent platform management interface (IPMI) controller, or other types of service processors. In one embodiment, out-of-band management agent 390 is a virtual machine or a partition of a larger system, such as another computer system or network system.

According to one embodiment, the mode bit within protected registers 120 enables out-of-band agent 390 to access or modify trusted or secure resources within platform 300. In such an embodiment, out-of-band agent 390 is treated as a trusted component if the mode bit is enabled. Thus, platform 300 can attest to the ability to trust out-of-band agent 390. However, out-of-band agent 390 is to be trusted in order for platform 300 to be trusted.

In one embodiment, third party review is conducted of all the code in out-of-band agent 390 to certify that agent 390 is secure. In further embodiments, the third party review may also certify that agent 390 is to maintain secrets, perform cryptographic strength encryption and attestation. Once agent 390 is certified, the mode bit may be enabled.

If out-of-band agent 390 is not certified the mode bit is disabled, indicating that agent 390 is not to be trusted. As a result, out-of-band agent 390 is not permitted to affect the trust of platform 300, and platform 300 can be trusted without attesting to the trust of out-of-band agent 390.

Figure 4:
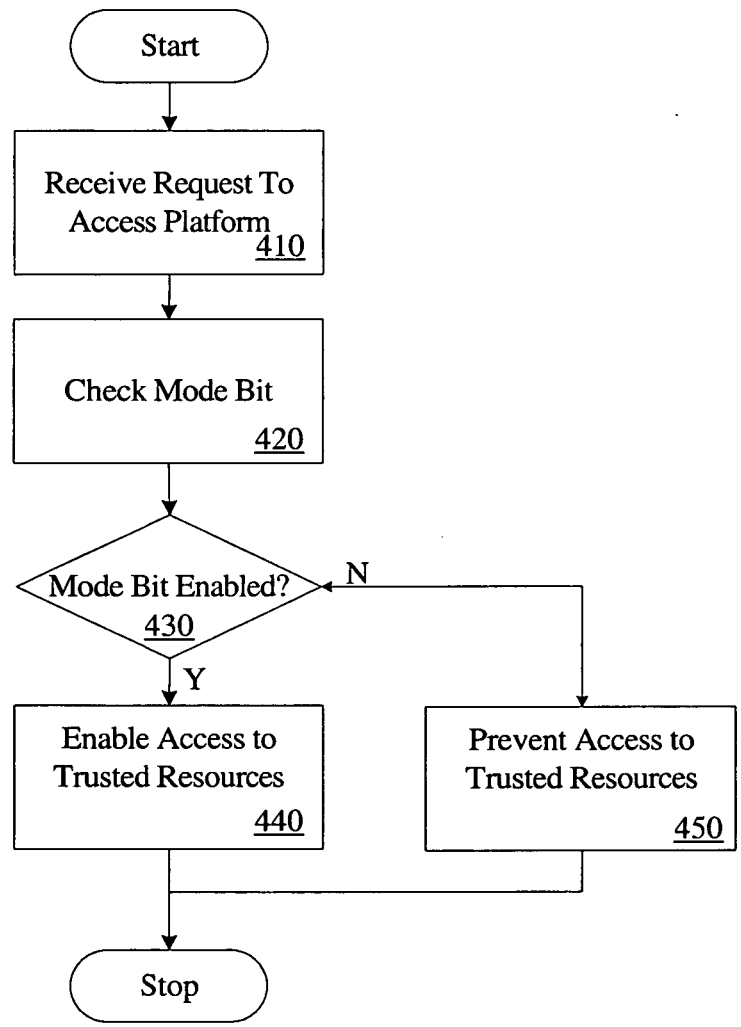
FIG. 4 is a flow diagram of one embodiment of providing access to trusted resources.

FIG. 4 is a flow diagram of one embodiment for providing access of platform 300 to an out-of-band agent 390. At processing block 410, a request is received from out-of-band agent 390 to access the resources of computer system 100, particularly platform 300. It processing block 420, the mode bit within register 120 is checked to determine the security status of out-of-band agent 390.

At decision block 430, it is determined whether the mode bit is enabled. If the mode bit is enabled, out-of-band agent 390 is trusted and is permitted to access trusted resources, processing block 440. Trusted code on platform 300 can attest to if the system 100 hardware (e.g., hardware 380) is in a mode that requires trusting out-of-band agent 390. If the mode bit is disabled, out-of-band agent 390 is untrusted, resulting in hardware 390 preventing access to any trusted resource in computer system 100.

The above-described mechanism enables a single chipset to be used with both trusted and untrusted out-of-band agents, as well as to be able to attest to the need to trust the out-of-band agent.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A computer system comprising:
   a central processing unit (CPU) to simultaneously operate a trusted environment and an untrusted environment; and
   a chipset, coupled to the CPU, including:
      an interface to couple to an out-of-band management agent; and
      protected registers having a bit to indicate if the out-of-band management agent is provided access to resources within the trusted environment.

2. The computer system of claim 1 wherein the out-of-band management agent is permitted to access the resources within the trusted environment if the bit is enabled.

3. The computer system of claim 2 wherein the out-of-band management agent is permitted to modify the resources within the trusted environment if the bit is enabled.

4. The computer system of claim 1 wherein the out-of-band management agent is not permitted to access the resources within the trusted environment if the bit is disabled.

5. The computer system of claim 4 wherein the out-of-band management agent is permitted to access resources within the untrusted environment if the bit is disabled.

6. A method comprising:
   receiving a request from an out-of-band management agent to access a computer system simultaneously operating a trusted environment and an untrusted environment; and
   determining if a bit within a protected register is enabled; and
   permitting the out-of-band management agent to access resources within the trusted environment if the bit is enabled.

7. The method of claim 6 further comprising permitting the out-of-band management agent to modify the resources within the trusted environment if the bit is enabled.

8. The method of claim 6 further comprising preventing the out-of-band management agent from accessing the resources within the trusted environment if the bit is disabled.

9. The method of claim 6 further comprising permitting the out-of-band management agent to access resources within the untrusted environment if the bit is disabled.

10. A system comprising:
    an out-of-band management agent; and
    a computer system platform to simultaneously host a trusted environment and an untrusted environment, the computer system platform including an integrated circuit (IC) having:
       an interface to couple to the out-of-band management agent; and
       protected registers having a bit to indicate if the out-of-band management agent is provided access to resources within the trusted environment.

11. The system of claim 10 wherein the out-of-band management agent is permitted to access the resources within the trusted environment if the bit is enabled.

12. The system of claim 11 wherein the out-of-band management agent is permitted to modify the resources within the trusted environment if the bit is enabled.

13. The system of claim 10 wherein the out-of-band management agent is not permitted to access the resources within the trusted environment if the bit is disabled.

14. The system of claim 13 wherein the out-of-band management agent is permitted to access resources within the untrusted environment if the bit is disabled.

15. The system of claim 10 wherein the out-of-band management agent is a virtual machine of a second computer system platform.

16. A non-transient computer readable medium having stored thereon a program of instructions that, when executed by a processing unit, causes the processing unit to:
    receive a request from an out-of-band management agent to access a computer system simultaneously operating a trusted environment and an untrusted environment; and
    determine if a bit within a protected register is enabled; and
    permit the out-of-band management agent to access resources within the trusted environment if the bit is enabled.

17. The non-transient computer readable medium of claim 16 wherein the program of instructions, when executed by a processing unit, further causes the processing unit to permit the management agent to modify the resources within the trusted environment if the bit is enabled.

18. The non-transient computer readable medium of claim 16 wherein the program of instructions, when executed by a processing unit, further causes the processing unit to prevent the management agent from accessing the resources within the trusted environment if the bit is disabled.

19. The non-transient computer readable medium of claim 16 wherein the program of instructions, when executed by a processing unit, further causes the processing unit to permit the management agent to access resources within the untrusted environment if the bit is disabled.

* * * * *